(12) United States Patent  
Kuesel et al.

(10) Patent No.: US 7,884,819 B2  
(45) Date of Patent: Feb. 8, 2011

(54) PIXEL COLOR ACCUMULATION IN A RAY TRACING IMAGE PROCESSING SYSTEM

(75) Inventors: Jamie R. Kuesel, Rochester, MN (US); Eric O. Mejdrich, Rochester, MN (US); Robert A. Shearer, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 646 days.

(21) Appl. No.: 11/535,581

(22) Filed: Sep. 27, 2006

(65) Prior Publication Data

US 2008/0074420 A1 Mar. 27, 2008

(51) Int. Cl.
*G06T 15/50* (2006.01)
(52) U.S. Cl. .................................................... 345/426
(58) Field of Classification Search ................. None
See application file for complete search history.

(56) References Cited

U.S. PATENT DOCUMENTS

| | | | | |
|---|---|---|---|---|
| 6,111,582 | A * | 8/2000 | Jenkins | 345/421 |
| 6,621,925 | B1 | 9/2003 | Ohmori et al. | |
| 7,012,604 | B1 | 3/2006 | Christie et al. | |
| 7,126,605 | B1 * | 10/2006 | Munshi et al. | 345/428 |
| 7,623,137 | B1 * | 11/2009 | Miller | 345/592 |
| 2004/0001062 | A1 * | 1/2004 | Pharr | 345/426 |
| 2006/0066607 | A1 * | 3/2006 | Schmittler et al. | 345/419 |
| 2008/0043018 | A1 * | 2/2008 | Keller et al. | 345/426 |

OTHER PUBLICATIONS

Tim Foley , Jeremy Sugerman, KD-tree acceleration structures for a GPU raytracer, Proceedings of the ACM SIGGRAPH/EUROGRAPHICS conference on Graphics hardware, Jul. 30-31, 2005, Los Angeles, California [doi>10.1145/1071866.1071869].*
Slusallek, P., Shirley, P., Mark, W., Stoll, G., and Wald, I. 2005. Introduction to real-time ray tracing. In ACM SIGGRAPH 2005 Courses (Los Angeles, California, Jul. 31-Aug. 4, 2005). J. Fujii, Ed. SIGGRAPH '05. ACM, New York, NY, 1. DOI= http://doi.acm.org/10.1145/1198555.1198740.*
Martin Christen. Ray tracing on GPU. Master's thesis, Univ. of Applied Sciences Basel (FHBB), 2005.*
Yagel, R. et al: "Priority-driven ray tracing", Journal of Visualization and Computer Animation, Wiley, UK, vol. 1, No. 1, Jan. 1997, pp. 17-32, XP002467277.

(Continued)

*Primary Examiner*—Daniel F Hajnik
(74) *Attorney, Agent, or Firm*—Patterson & Sheridan LLP

(57) ABSTRACT

By merging or adding the color contributions from objects intersected by secondary rays, the image processing system may accumulate color contributions to pixels from objects intersected by secondary rays as the further color contributions are determined. Furthermore, by associating a scaling factor of color contribution with objects and with secondary rays which intersect the objects, color contributions due to secondary ray/object intersections may be calculated at a later time than the color contribution to a pixel from original ray/object intersection. Consequently, it is not necessary for a vector throughput engine or a workload manager to wait for all secondary ray/object intersections to be determined before updating the color of a pixel.

11 Claims, 8 Drawing Sheets

OTHER PUBLICATIONS

Sequin, C H et al: "Parameterized Ray Tracing", Computer Graphics, New York, NY, US, vol. 23, No. 3, Jul. 1989, pp. 307-314, XP002047491.

Benthin, C et al: "Ray Tracing on the Cell Processor", Interactive Ray Tracing 2006, IEEE Symposium on IEEE, PI, Sep. 2006, pp. 15-23, XP031008767.

Woop, S et al: "RPU: A programmable ray processing unit for realtime ray tracing", ACM Transactions on Graphics ACM USA, vol. 24, No. 3, Jul. 2005, pp. 434-444, XP002466402.

Reshetov A et al: "Multi-level ray tracing algorithm", ACM Transactions on Graphics ACM USA, vol. 24, No. 3, Jul. 2005, pp. 1176-1185, XP002466403.

J.G. Cleary, B.M. Wyvill, G.M. Birtwistle and R. Vatti, "Multiprocessor Ray Tracing," Computer Graphics Forum, vol. 5, issue 1, pp. 3-12, 1986.

M. Pharr, C. Kolb, R. Gershbein and P. Hanrahan, "Rendering Complex Scenes with Memory-Coherent Ray Tracing," in Computer Graphics, vol. 31, pp. 101-108, Aug. 1997, ACM Siggraph 1997 Conference Proceedings.

* cited by examiner

PIXEL COLOR ACCUMULATION IN A RAY TRACING IMAGE PROCESSING SYSTEM

BACKGROUND OF THE INVENTION

1. Field of the Invention

Embodiments of the invention generally relate to the field of computer processing.

2. Description of the Related Art

The process of rendering two dimensional images from three dimensional scenes is commonly referred to as image processing. As the modern computer industry evolves image processing evolves as well. One particular goal in the evolution of image processing is to make two dimensional simulations or renditions of three dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three dimensional scene onto a two dimensional monitor using pixels is called rasterization. Rasterization is the process of taking a two dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three dimensional geometric objects in a scene projected onto a two dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three dimensional scene onto a two dimensional monitor using pixels is called ray tracing. The ray tracing technique traces the propagation of imaginary rays, rays which behave similar to rays of light, into a three dimensional scene which is to be rendered onto a computer screen. The rays originate from the eye(s) of a viewer sitting behind the computer screen and traverse through pixels, which make up the computer screen, towards the three dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two dimensional display of the computer screen, the two dimensional synthesis of the three dimensional scene can be displayed on the computer screen to the viewer.

Ray tracing typically renders real world three dimensional scenes with more realism than rasterization. This is partially due to the fact that ray tracing simulates how light travels and behaves in a real world environment, rather than simply projecting a three dimensional shape onto a two dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Therefore, there exists a need for more efficient techniques and devices to perform ray tracing.

SUMMARY OF THE INVENTION

Embodiments of the present invention generally provide methods and apparatus for performing ray tracing.

According to one embodiment of the invention, a method of determining a color of a pixel in a ray tracing image processing system is provided. The method generally comprising: issuing a primary ray into a three dimensional scene through the pixel; determining an initial color value for the pixel based on a color value of a first primitive intersected by the primary ray; issuing at least one secondary ray into the scene from the primitive intersected by the primary ray; and updating the color value for the pixel based on a color value of a second primitive intersected by the secondary ray and a scaling factor associated with the first primitive intersected by the primary ray.

According to another embodiment of the invention, an image processing system is provided. The system generally comprising: a memory cache; a first processing element configured to issue an original ray into a three dimensional scene through a pixel, traverse a spatial index with the original ray until a first leaf node is reached; and a second processing element configured to receive, from the first processing element, information defining the original ray and the first leaf node, determine a first color contribution to the pixel based on a color of a first primitive intersected by the original ray, determine a first scaling factor of color contribution based on the first primitive, issue at least one secondary ray based on the intersection of the original ray and the first primitive, and associate the first scaling factor of color contribution with the at least one secondary ray.

According to another embodiment of the invention a computer readable medium is provided. The computer readable medium contains a program which, when executed, performs an operation generally comprising: issuing a primary ray into a three dimensional scene through the pixel; determining an initial color value for the pixel based on a color value of a first primitive intersected by the primary ray; issuing at least one secondary ray into the scene from the primitive intersected by the primary ray; and updating the color value for the pixel based on a color value of a second primitive intersected by the secondary ray and a scaling factor associated with the first primitive intersected by the primary ray.

DETAILED DESCRIPTION OF THE PREFERRED EMBODIMENTS

Figure 1:
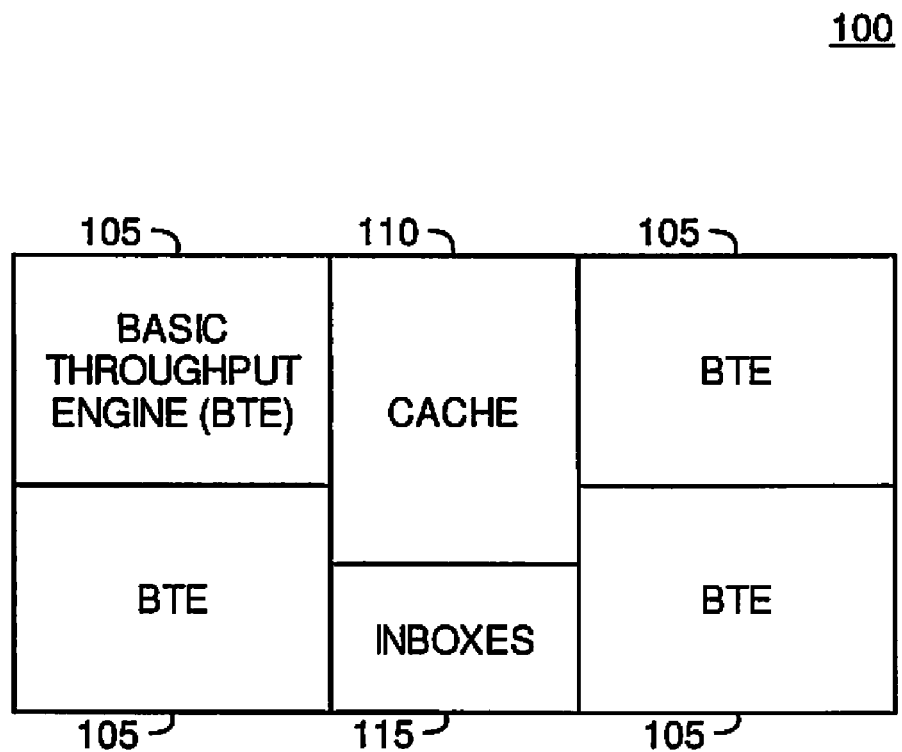
FIG. 1 illustrates a multiple core processing element, according to one embodiment of the invention.

Embodiments of the invention provide methods and apparatus for updating the color of a pixel when processing an image using a ray tracing methodology. According to one embodiment of the invention, a scaling factor may be associated with objects intersected by original rays and secondary rays within a three dimensional scene. If an original ray issued by an image processing system and traced through a spatial index by a first processing element intersects an object, the color of the intersected object may be used to update the color of the pixel through which the original ray passed. Furthermore, secondary rays may be spawned from the point the original ray intersected the object to determine if other objects within the three dimensional scene contribute to the color of the pixel through which the original ray passed. According to one embodiment of the invention, information defining the spawned secondary rays may also include a scaling factor associated with the object intersected by the previous ray (e.g., the original ray). By including a scaling factor associated with the object intersected by the previous ray (e.g., the original ray), additional color contribution to a pixel from objects secondary rays intersect may be calculated independently (e.g., at a later time or by a separate processing element) from the color contribution to the pixel due to an object the original ray intersects.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Processor Layout and Communications Network

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two dimensional image from a three dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
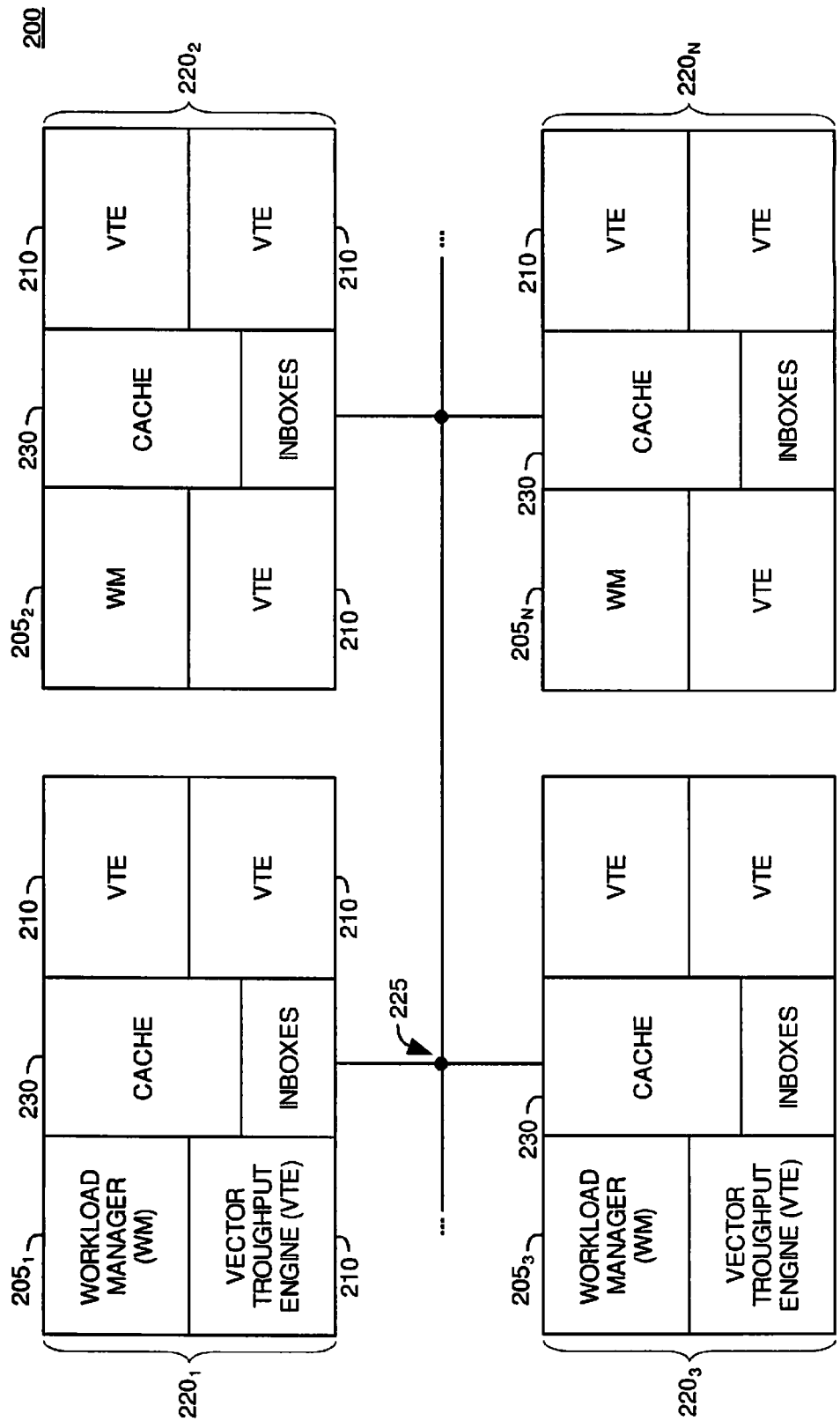
FIG. 2 illustrates a multiple core processing element network, according to embodiments of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each multiple core processing element $220_{1-N}$ in the network of multiple core processing elements 200 may also contain a plurality of vector throughput engines 210, according to one embodiment of the invention.

The workload managers $205_{1-N}$ may use a high speed bus 225 to communicate with other workload managers $205_{1-N}$ and/or vector throughput engines 210 of other multiple core processing elements $220_{1-N}$, according to one embodiment of the invention. Each of the vector throughput engines 210 may use the high speed bus 225 to communicate with other vector throughput engines 210 or the workload managers $205_{1-N}$. The workload manager processors 205 may use the high speed bus 225 to collect and distribute image processing related tasks to other workload managers $205_{1-N}$, and/or distribute tasks to other vector throughput engines 210. The use of a high speed bus 225 may allow the workload managers $205_{1-N}$ to communicate without affecting the caches 230 with data packets related to workload manager communications.

An Exemplary Three Dimensional Scene

Figure 3:
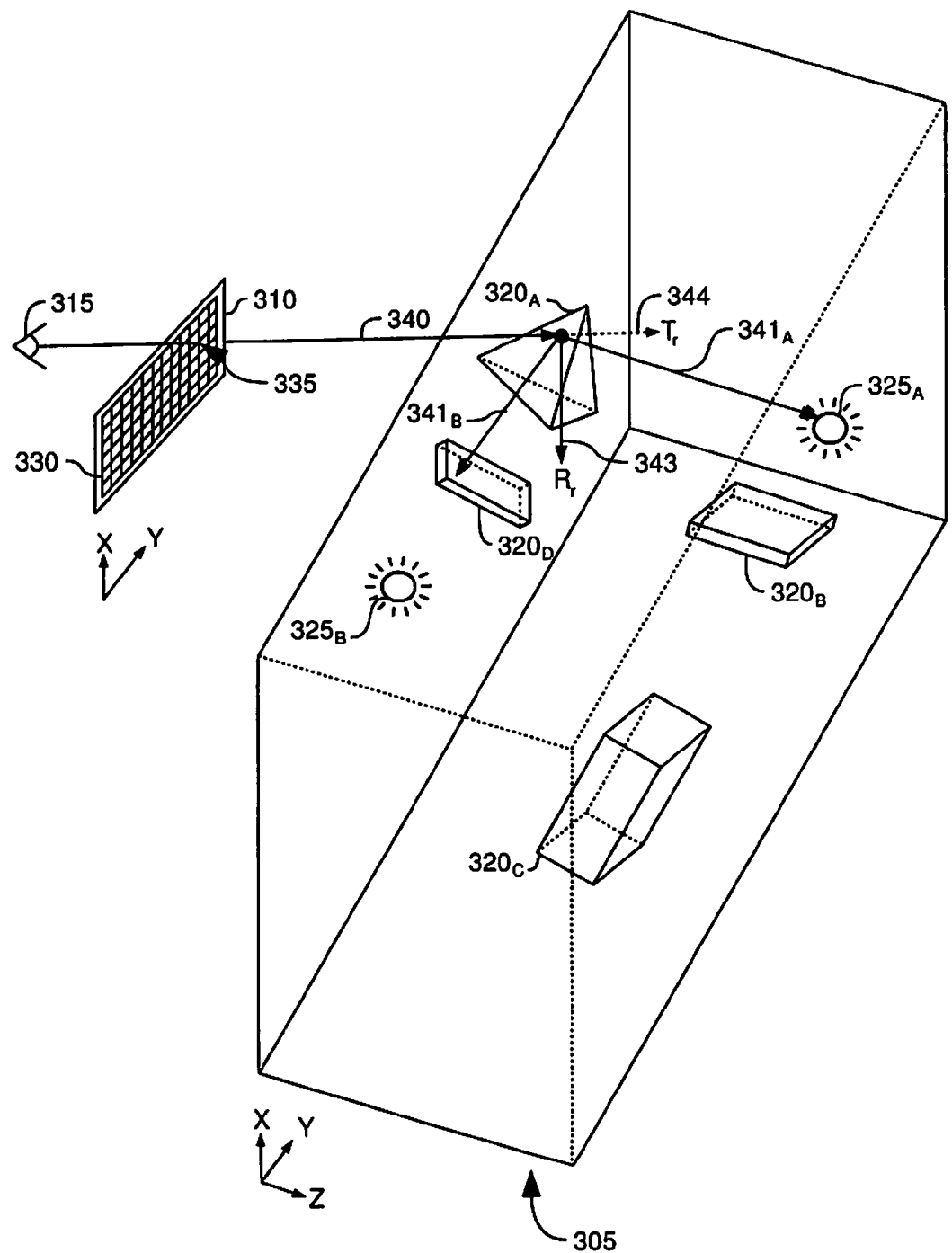
FIG. 3 is an exemplary three dimensional scene to be rendered by an image processing system, according to one embodiment of the invention.

FIG. 3 is an exemplary three dimensional scene 305 to be rendered by an image processing system. Within the three dimensional scene 305 may be objects 320. The objects 320 in FIG. 3 are of different geometric shapes. Although only four objects 320 are illustrated in FIG. 3, the number of objects in a typical three dimensional scene may be more or less. Commonly, three dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three dimensional scene 305 may be rendered into a two dimensional picture by an image processing system. The image processing system may also cause the two dimensional picture to be displayed on a monitor 310. The monitor 310 may use many pixels 330 of different colors to render the final two dimensional picture.

One method used by image processing systems to render a three dimensional scene 320 into a two dimensional picture is called ray tracing. Ray tracing is accomplished by the image processing system "issuing" or "shooting" rays from the perspective of a viewer 315 into the three dimensional scene 320. The rays have properties and behavior similar to light rays.

One ray 340, that originates at the position of the viewer 315 and traverses through the three dimensional scene 305, can be seen in FIG. 3. As the ray 340 traverses from the viewer 315 to the three dimensional scene 305, the ray 340 passes through a plane where the final two dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. The grid 330 may be referred to as a frame. Each individual pixel may display a different color to render the final composite two dimensional picture on the monitor 310. An image processing system using a ray tracing image processing methodology to render a two dimensional picture from a three dimensional scene will calculate the colors that the issued ray or rays encounters in the three dimensional scene. The image processing scene will then assign the colors encountered by the ray to the pixel through which the ray passed on its way from the viewer to the three dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two dimensional picture. Some pixels may not have any rays issued by the image processing system, in which case their color may be determined, approximated or assigned by algorithms within the image processing system.

To determine the final color of the pixel 335 in the two dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three dimensional scene the ray 305 may strike objects. As the rays strike objects within the scene, the color of the object may be assigned to the pixel through which the ray passes. However, the color of the object must be determined before it is assigned to the pixel.

Many factors may contribute to the color of the object struck by the original ray 340. For example, light sources within the three dimensional scene may illuminate the object. Furthermore, physical properties of the object may contribute to the color of the object. For example, if the object is reflective or transparent, other non-light source objects may then contribute to the color of the object.

In order to determine the effects from other objects within the three dimensional scene, secondary rays may be issued from the point where the original ray 340 intersected the object. For example, shadow rays 341 may be issued to determine the contribution of light to the point where the original ray 340 intersected the object. If the object has translucent properties, the image processing system may issue a transmitted or a refracted ray 344 to determine what color or light to be transmitted through the body of the object. If the object has reflective properties, the image processing system may issue a reflected ray to determine what color or light is reflected onto the object 320.

One type of secondary ray may be a shadow ray. Each shadow ray may be traced from the point of intersection of the original ray and the object, to a light source within the three dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source 325B will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted or refracted ray. A refracted ray may be issued by the image processing system if the object with which the original ray intersected has transparent or translucent properties (e.g., glass). A refracted ray traverses through the object at an angle relative to the angle at which the original ray struck the object. For example, refracted ray 344 is seen traversing through the object $320_A$ which the original ray 340 intersected.

Another type of secondary ray is a transmitted or a refracted ray. If the object with which the original ray intersected has reflective properties (e.g. a metal finish), then a reflected ray will be issued by the image processing system to determine what color or light may be reflected onto the object. Reflected rays traverse away from the object at an angle relative to the angle at which the original ray intersected the object. For example, reflected ray 343 may be issued by the image processing system to determine what color or light may be reflected onto the object $320_A$ which the original ray 340 intersected.

The total contribution of color and light of all secondary rays (e.g., shadow rays, transmitted rays, reflected rays, etc.) will result in the final color of the pixel through which the original ray passed.

An Exemplary KD-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three dimensional scene or world into smaller volumes (smaller relative to the entire three dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume, then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 4A:
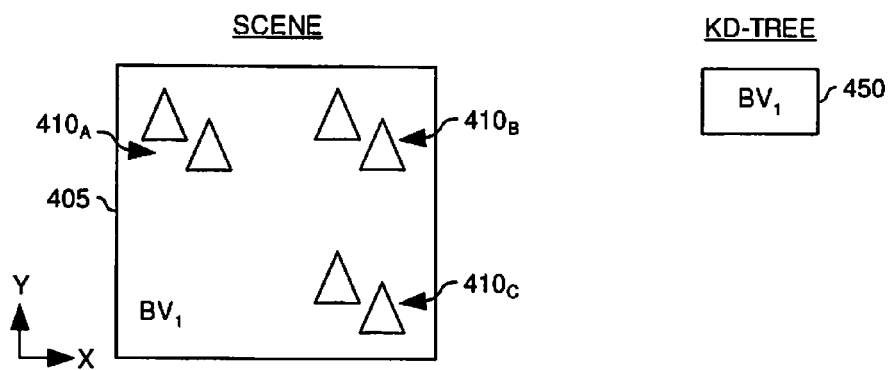
FIGS. 4A-4C illustrate a two dimensional space to be rendered by an image processing system and a corresponding spatial index created by an image processing system, according to one embodiment of the invention.
Figure 4B:
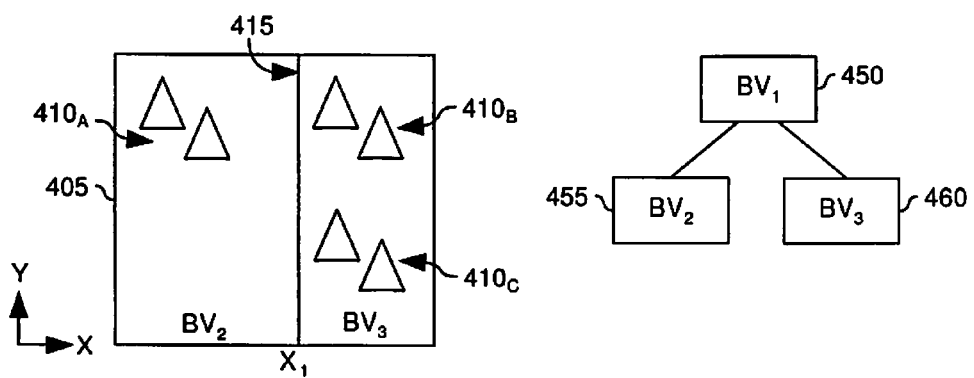
Figure 4C:
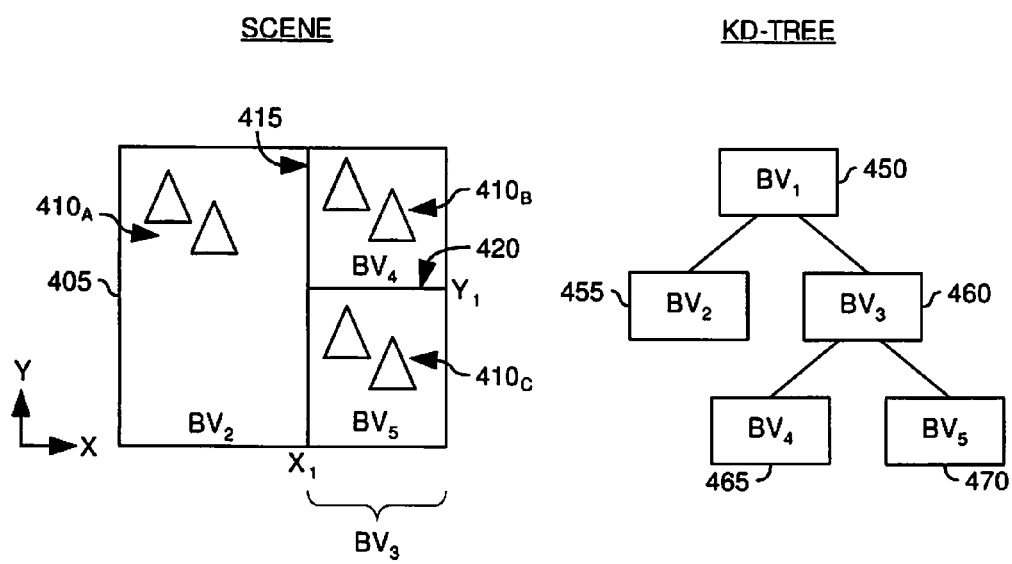

FIGS. 4A-4C illustrate a two dimensional space to be rendered by an image processing system and a corresponding kd-tree. For simplicity, a two dimensional scene is used to illustrate the building of a kd-Tree, however kd-Trees may also be used to represent three dimensional scenes. In the two dimensional illustration of FIGS. 4A-4C splitting lines are illustrated instead of splitting planes, and bounding areas are illustrated instead of bounding volumes as would be used in a three dimensional structure. However, one skilled in the art will quickly recognize that the concepts may easily be applied to a three dimensional scene containing objects.

FIG. 4A illustrates a two dimensional scene 405 containing primitives 410 to be rendered in the final picture to be displayed on a monitor 310. The largest volume which represents the entire volume of the scene is encompassed by bounding volume 1 ($BV_1$). In the corresponding kd-Tree this may be represented by the top level node 450, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 4A, $BV_1$ contains six primitives, therefore kd-Tree construction algorithm may partition $BV_1$ into smaller bounding volumes.

FIG. 4B illustrates the same two dimensional scene 405 as illustrated in FIG. 4A. However, in FIG. 4B the tree construction algorithm has partitioned $BV_1$ into two smaller bounding volumes $BV_2$ and $BV_3$. The partitioning of $BV_1$, was accomplished, by drawing a splitting plane $SP_1$ 415 along the x-axis at point $x_1$. This partitioning of $BV_1$ is also reflected in the kd-Tree as the two nodes 455 and 460, corresponding to $BV_2$ and $BV_3$ respectively, under the internal or parent node $BV_1$ 450. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $410_A$). Nodes which are not partitioned or sub-divided any further, such as $BV_2$, are referred to as leaf nodes.

FIG. 4C illustrates the same two dimensional scene 405 as illustrated in FIG. 4B. However, in FIG. 4C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 465 and 470, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $410_A$, leaf node $BV_4$ may contain pointers to primitives $410_B$ and leaf node $BV_5$ may contain pointers to primitives $410_C$.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if the ray intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), then the workload manager 205 may send the ray and associated information to a vector throughput engine 210 for ray-primitive intersection tests. A ray-primitive intersection test may be executed to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

The resulting kd-Tree structure, or other spatial index structure, may be stored in a processor cache 230. The kd-Tree and the size of corresponding data which comprises the kd-Tree may be optimized for storage in a processor cache 230. The storage of the kd-Tree in a processor cache 230 may allow a workload manager 205 to traverse the kd-Tree with a ray that has been issued by the image processing system without having to retrieve the kd-Tree from memory every time a ray is issued by the image processing system.

Pixel Color Accumulation

According to one embodiment of the invention, a pixel color accumulation algorithm using a scaling factor of color contribution may be used such that rays issued into a three dimensional scene prior in time by the image processing system may contribute to the color of a pixel regardless of whether or not all color contributions due to secondary rays (e.g., due to reflection and refraction) have been calculated.

As described with reference to FIG. 3, a final two dimensional image rendered from a three dimensional scene may contain several thousand if not millions of pixels. An image processing system may issue rays through the pixels and into the three dimensional scene to determine a color to assign to the pixel. As the ray strikes an object within the three dimensional scene, the color of the object may be used to determine the color of the pixel through which the ray passed after it was issued. Furthermore, other objects within the three dimensional scene (struck by secondary rays spawned from the first ray) may also contribute to the color of the pixel.

Figure 5:
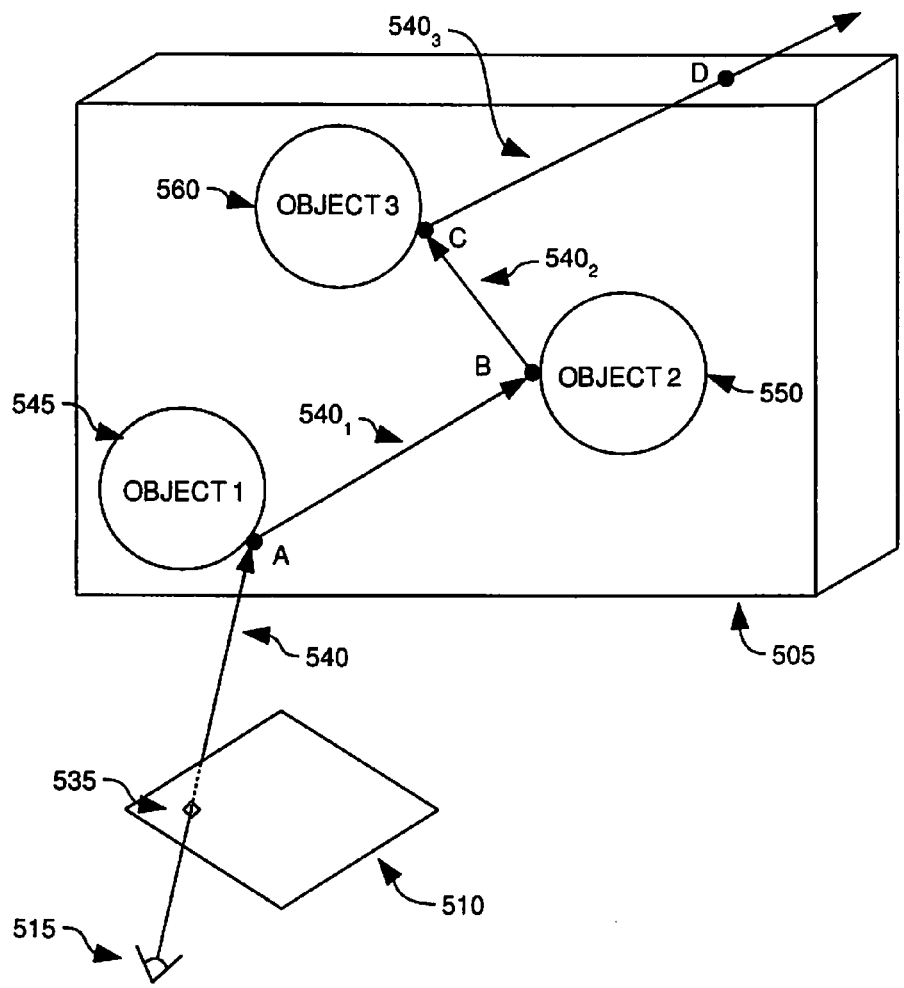
FIGS. 5 and 7 illustrate an exemplary three dimensional scene to be rendered by an image processing system, according to one embodiment of the invention.

For example, FIG. 5 illustrates an original ray 540 being issued into a three dimensional scene 505. The original ray 540 is issued from a viewpoint 515 and traverses through a pixel 535 as it makes its way into the three dimensional scene 505. The pixel 535 may be part of a final two dimensional image or frame 510 to be rendered by the image processing system. As the original ray 540 traverses through the three dimensional scene 505, the original ray 540 may strike or intersect a first object 545 at point A. The color of the intersected first object 545 may be used by the image processing system to determine the color of the pixel 535 through which the original ray 540 passed. Furthermore, if the intersected object 545 has certain properties, other objects (e.g., 550, 560) may also contribute to the color of the pixel 535. For example, the object 545 may have reflective properties (e.g., a mirror like finish) and/or refractive properties (e.g., translucent) which may cause other objects (e.g., 550, 560) to contribute to the color of the intersected object 545 at the point (A) which the original ray 540 intersected the object 545. The contribution of color at the intersection point (A) may change the color of the pixel 535 through which the original ray 540 passed.

Secondary rays (e.g., $540_{1-3}$) may be issued by the image processing system to determine if other objects contribute color to the pixel due to the reflective or refractive properties of the object 540 intersected by the original ray 540. An image processing system using a ray tracing methodology may calculate the contribution of color from all secondary rays in order to render realistic two dimensional images.

As described above with respect to FIG. 4, in an image processing system using a ray tracing methodology, a workload manager 205 may traverse a spatial index (e.g., kd-tree) to determine if a ray intersects a leaf node. If the ray intersects a bounding volume which contains only primitives (i.e., a leaf node), then the workload manager 205 may send information defining the ray and information defining the intersected leaf node to a vector throughput engine 210 for ray-primitive intersection tests. A ray-primitive intersection test may be executed to determine if the ray intersects the primitives within the bounding volume defined by the leaf node. In addition to performing ray-primitive intersection tests, a vector throughput engine 210 may, after determining that a ray does intersect a primitive, determine the color of the primitive at the intersection point to be contributed to the pixel through which the ray passed.

Furthermore, the vector throughput engine 210 may issue or spawn a secondary ray or secondary rays based upon the surface properties of the intersected object (e.g., reflective, refractive). The vector throughput engine 210 may spawn a secondary ray by calculating a trajectory for the secondary ray and sending the ray to a workload manager for traversal through the spatial index. A workload manager 205 may trace the secondary ray through the spatial index and a vector throughput engine 210 may perform calculations to determine if the secondary ray intersects an object (primitive) within the three dimensional scene. Furthermore, if the secondary ray intersects an object in the three dimensional scene, the vector throughput engine 210 may calculate what color the object contributes to the pixel through which the original ray passed.

The color contribution to the pixel from a secondary ray is dependent on the properties of the object or objects intersected by a previous series of rays. The previous series of rays may be all of the rays previous to the secondary ray which caused the secondary ray to be spawned.

For example, the color contribution to the pixel 535 illustrated in FIG. 5 from secondary ray $540_3$ is dependent on properties of the objects (i.e., object 1, object 2, and object 3) intersected by the series of rays previous to the secondary ray which caused the secondary ray to be spawned (i.e., ray 540, ray $540_1$, and ray $540_2$).

One method of determining the color of a pixel may be to calculate a final color of the pixel by traversing the original ray and all of the secondary rays related to the pixel 535 through the spatial index and calculate their color contributions to the pixel 535 before issuing a subsequent original ray through a second or different pixel in the frame 510. This way, the properties of the objects on which secondary rays are dependent are present in memory (e.g., cache or local data registers) and can be used to determine the secondary ray color contribution for each subsequently spawned secondary ray.

However, due to the large number of secondary rays which may be spawned from an original ray and its subsequent secondary rays, and the large number of calculations required to determine the color contribution of each secondary ray, waiting to issue another ray into the three dimensional scene may require a processing element (e.g., a workload manager 205 or a vector throughput engine 210) to unnecessarily maintain a large number of interim results of calculations related to secondary rays within memory. Furthermore, waiting to issue another ray into the three dimensional scene until all of the secondary rays have been traversed through the spatial index may require the processing element to wait a relatively long amount of time. Consequently, the overall time necessary to render a two dimensional image from the three dimensional scene may be increased and the performance of the ray tracing image processing system reduced.

However, according to embodiments of the invention, another method of determining the color of a pixel may be to update or accumulate the color of a pixel as rays intersect objects within the three dimensional scene. In order to update the color of the pixel as rays intersect objects within the three dimensional scene, a scaling factor of color contribution may be associated with secondary rays and with objects within the three dimensional scene. As described further below, the scaling factor of color contribution may allow calculations which are dependent on the properties of the previously intersected objects to be calculated independently of the calculations relating to the previously intersected objects. Thus, in contrast to finishing all of the calculations to determine the color of the pixel, the color of the pixel may be updated as rays intersect objects within the three dimensional scene.

By enabling independent calculations to determine the color contribution to the pixel due to a secondary ray (i.e., by using a scaling factor of color contribution), the calculations may be performed by separate processing elements. Furthermore, according to embodiments of the invention, separate processing elements may update the color of the pixel (stored for example in a frame buffer) as the color contributions from secondary rays are calculated by the separate processing elements. Thus, in contrast to one processing element determining the final color of a pixel by determining the color contribution from all secondary rays to the pixel, the color contribution from secondary rays may be performed by a plurality of processing elements without the need to wait until all secondary rays have been traced through the three dimensional scene 505 to determine a color to assign to the pixel. This method may require less time to determine the final color of the pixel, and thus may improve the performance of a ray tracing image processing system.

Figure 6:
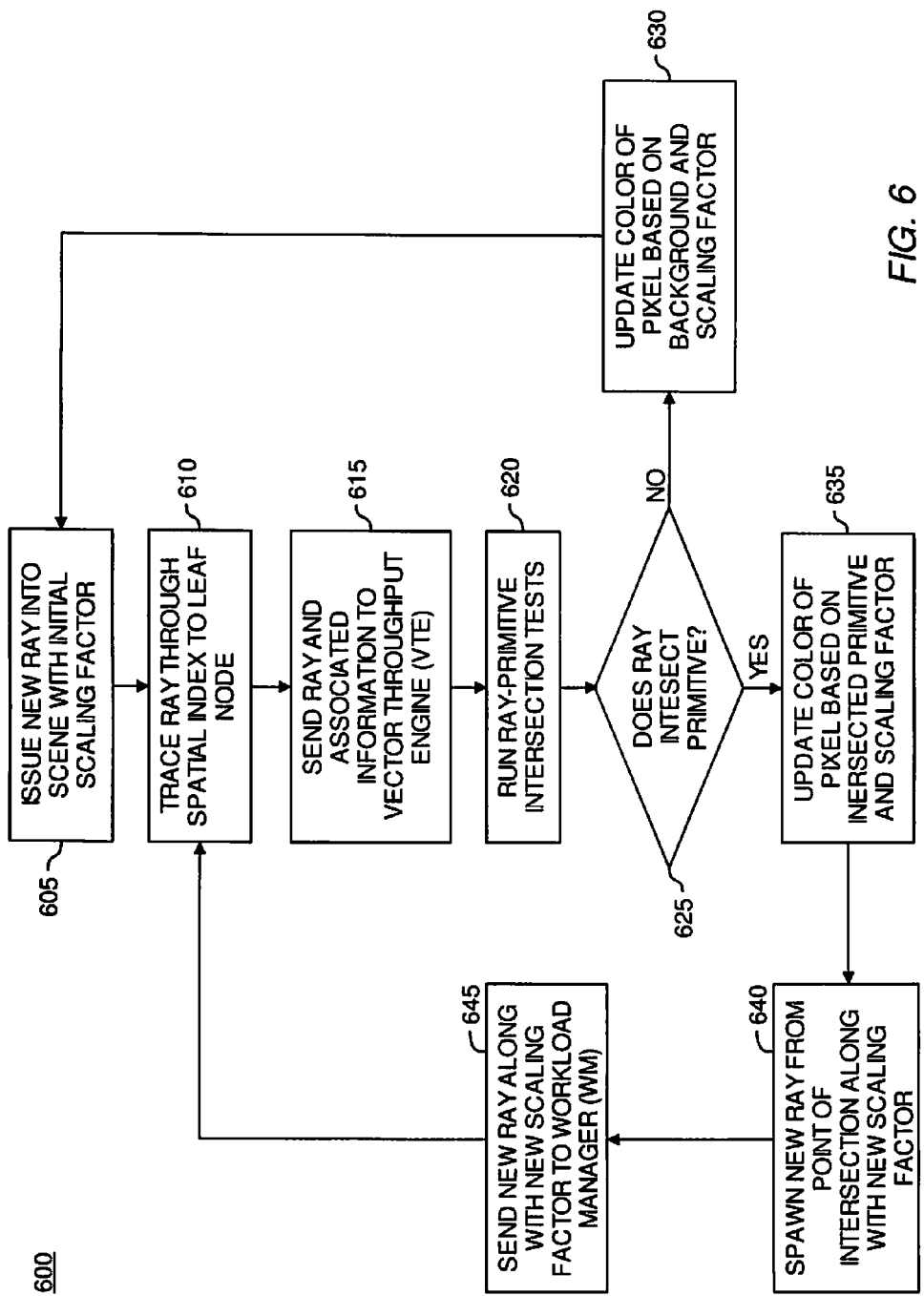
FIG. 6 is a flowchart illustrating a method of updating the color of a pixel, according to one embodiment of the invention.

FIG. 6 illustrates is a flowchart illustrating a method 600 of accumulating the color of a pixel 535 due to original and secondary rays intersecting objects a two dimensional image, according to one embodiment of the invention. The method 600 begins at step 605 when a ray tracing image processing system issues an original ray 540 into a three dimensional scene 505. Because the ray is being issued into the three dimensional scene 505, the ray may be referred to as an original ray. This is in contrast to a secondary ray which may be issued or spawned from a location inside the three dimensional scene 505 at a point where an original or a secondary ray strikes an object.

When the original ray 540 is issued into the scene, the image processing system may associate a scaling factor of color contribution with the original ray 540. This being the original ray issued into the three dimensional scene, in contrast to a secondary ray, the scaling factor may be, for example, 1 or 100%. As explained later with respect to step 630 the scaling factor of color contribution may be different for secondary rays (e.g., $540_{1-3}$) issued from intersected objects. Also associated with the original ray 540 may be information defining the pixel 535 through which the original ray 540 passed as it traversed towards the three dimensional scene 505.

Next at step 610 the image processing system may use a workload manager 205 to trace the original ray 540 through a spatial index (e.g., a kd-tree). The workload manager 205 may continue to trace the ray through the spatial index until a leaf node is reached (i.e., a node defining a bounding volume which contains only primitives).

After a leaf node has been reached, at step 615, the workload manager 205 may send information defining the ray 540 (e.g., trajectory, the scaling factor of color contribution, information defining the pixel 535, etc.) to a vector throughput engine 210 for ray-primitive intersection tests. In an image processing system using a plurality of workload managers $205_{1-n}$ and a plurality of vector throughput engines $210_{1-n}$, the workload manager which traced the original ray 540 to a leaf node may send the ray information to any of the plurality of vector throughput engines $210_{1-n}$, for example, via the plurality of inboxes 115 and the high speed bus 225.

After a vector throughput engine 210 has received the ray information, at step 620 the vector throughput engine 210 may run or execute ray-primitive intersection tests. Based on the results of the ray-primitive intersection tests the vector throughput engine 210 may determine whether the ray 540 intersected a primitive located within the leaf node. Although presently described as determining if the ray 540 intersected a single primitive contained within the leaf node, the ray 540 may have intersected a plurality of primitives, in which case the vector throughput engine 210 may determine which primitive was intersected first by determining the distance from the viewpoint 515 to the intersected primitives, where the smallest distance being the first intersected primitive, and therefore the viewable primitive (i.e., the primitive which will contribute color to the pixel 535).

If, at step 625, the vector throughput engine 210 determines that the ray 540 did not intersect any primitives contained within the leaf node, the image processing system may proceed to step 630 where the vector throughput engine 210 may determine the color of the pixel through which the ray passed. Since the ray did not intersect any objects within the bounding volume corresponding to the leaf node the vector throughput engine 210 may not assign a color to the pixel 535 through which the ray 540 passed, and the workload manager 205 may retraverse the spatial index to determine if the ray 540 intersects another leaf node containing primitives. Alternatively, the vector throughput engine 210 may assign the background color of the three dimensional scene 505 to the pixel 535 through which the ray 540 passed.

If however, the vector throughput engine 210 determined at step 625 that the ray 540 intersected an object 545 (i.e., a primitive representing a portion of the object 545) within the leaf node, the image processing system may proceed to step 635. At step 635, the vector throughput engine 210 may determine the color of the object 545 at the point where the original ray 540 intersected the object 545 (e.g., point A). The color of the object 545 at the intersection point may be used as or assigned to the color of the pixel 535 through which the original ray 540 passed. However, a scaling factor of color contribution associated with the ray 540 being traced may alter the amount of color the object 545 contributes to the pixel. If the ray being traced is the original ray 540 issued by the image processing system, the scaling factor of color contribution may be, for example, 100%. The 100% may indicate that the pixel 535 should be assigned the color of the object 545 which it intersected without scaling (i.e., decreasing) the amount of color contributed to the pixel 535 from the intersected object 545.

The scaling factor of color contribution may be used to determine the amount of color an intersected object may contribute to the pixel through which the original ray passed. The amount of color an object contributes may be scaled because the color contribution from an object intersected by a secondary ray is through a reflection or refraction. An object intersected by a secondary ray is not contributing its color to the original pixel at the same amount of intensity as an object intersected by the original ray, rather it is contributing color to a lesser degree through a reflection or a refraction onto the object intersected by the original ray. Therefore, a scaling factor based on the physical properties (e.g., reflective, refractive) of the object from which a secondary ray was spawned may be associated with the secondary ray.

After the color of a pixel 535 through which the ray 540 passed is updated based on color of the intersected object 545 and the corresponding scaling factor, at step 640 the image processing system (through the use of the vector throughput engine 210) may spawn or issue secondary rays from the point the ray 540 intersected the object 545. For example, secondary ray 540, may be issued from point A where the original ray 540 intersected object 1 545. The secondary rays (e.g., $540_1$) may be spawned or issued with a trajectory determined by the angle of intersection as described above with reference to FIG. 3. The secondary rays may contribute additional color to the pixel 535 through which the original ray 540 passed. The secondary rays may contribute additional color to the intersected object (e.g., object 1 545) if the intersected object reflects color (e.g., a metallic or mirrored finish) or is at least partially transparent (e.g., a piece of glass or water) and allows color to propagate through. The information which defines each secondary ray 540, may also contain information which identifies the pixel 535 through which the original ray passed so that any further color contribution from the secondary rays (e.g., $540_2$ or $540_3$) may be assigned to the correct pixel 535 in the frame 510.

When the vector throughput engine 210 spawns the secondary rays, a scaling factor of color contribution may be assigned to each secondary ray. The scaling factor of color contribution for a secondary ray (e.g., $540_1$) may be determined based on the properties of the object (e.g., object 1 545) from which the secondary ray $540_1$ was spawned. Furthermore, according to embodiments of the invention, the scaling factor of color contribution may be determined based on any number of properties, for example, surface properties of the object, the incident angle of intersection between a ray and the intersected object, and/or environmental properties of the three dimensional scene which may alter the color contribution a secondary ray may have to the pixel through which the original ray passed.

For example, if the object has a metallic finish and is highly reflective, the scaling factor of color contribution associated with the reflected secondary ray spawned by the vector throughput engine 210 may be high (e.g., 85% or 0.85). A high reflective scaling factor of color contribution may indicate that other intersected objects may contribute a significant amount of color to object from which the secondary ray was spawned and thus to the pixel through which the original ray passed. In contrast, if the intersected object has a matte finish, the reflective scaling factor of color contribution for the object may be low (e.g., 35% or 0.35). A low reflective scaling factor of color contribution may indicate that other objects intersected by the secondary ray may not contribute (i.e. reflect onto the object) a significant amount of color to the pixel through which the original ray passed. to reduce the complexity of the illustration, FIG. 5 only illustrates reflective secondary rays (i.e., $540_{1-3}$).

Furthermore, a refractive scaling factor of color contribution may be associated with a refracted secondary ray. Similar to the reflective scaling factor of color contribution, the refractive scaling factor of color contribution may also be determined based on the properties of the object intersected by the prior ray (e.g., the original ray 540). For example, if the intersected object is clear, the refractive scaling factor of color contribution may be high for the object (e.g., 95% or 0.95). A high refractive scaling factor of color contribution may indicate that an object intersected by the secondary refractive ray may contribute a significant amount of color to the object at the point where the prior ray (e.g., the original ray 540) intersected the object and thus to the pixel through which the original ray passed. In contrast, if the object is partially opaque, the refractive scaling factor of color contribution may be low for the object (e.g., 25% or 0.25) indicating that an object intersected by the refractive secondary ray may not contribute a significant amount of color to the object at the point where the prior ray (e.g., the original ray 540) intersected the object.

After the scaling factor of color contribution has been associated with the secondary ray or rays, the image processing system may proceed to step 645 where the vector throughput engine 645 may send or pass the spawned secondary rays to a workload manager or managers. For example, the vector throughput engine 210 may pass the information defining the secondary ray (e.g., trajectory, scaling factor of color contribution, information defining the pixel through which the original ray passed) to a workload manager 205 via the plurality of inboxes 115 and/or the high speed bus 225. Furthermore, if a plurality of secondary rays were spawned (e.g., a reflected secondary ray and a refracted secondary ray) the secondary rays may be sent to different workload managers. For example, the reflected secondary ray may be sent to a first workload manager $205_1$ and the refracted secondary ray may be sent to a second workload manager $205_3$.

After the secondary ray information has been sent to a workload manager 205 or workload managers $205_{1-n}$ in step 645, the image processing system may proceed to step 610 where the workload manager 205 or managers $205_{1-n}$ may trace the secondary ray(s) through the spatial index or indexes representing the three dimensional scene 505. The image processing system may proceed from step 610 through the remaining steps in method 600 to determine if the secondary rays strike any more objects in the three dimensional scene 505, and if so spawn new secondary rays with new scaling factors of color contribution, and consequently determine the color contribution of intersected objects to the pixel 535 through which the original ray 540 passed.

In contrast to the original ray, if a secondary ray $540_1$ intersects objects within the three dimensional scene 505, the vector throughput engine 210 may use the scaling factor of color contribution associated with the secondary ray $540_1$ to determine how much color the object 550 intersected by the secondary ray $540_1$ may contribute to the pixel 535 through which the original ray 540 passed. This may be accomplished, for example, by multiplying the scaling factor associated with the previously intersected object 545 with the color of the presently intersected object 550. This new scaled color contribution value may then be sent back to the workload manager 205 responsible for updating the color of the pixel 535 through which the original ray 540 passed. The workload manager 205 may then merge or add the scaled color contribution (determined when the secondary ray intersected an object) to the color value of the pixel already stored in the frame buffer (e.g., the color determined when the original ray 540 intersected an object).

By merging or adding the color contributions from objects intersected by secondary rays, the image processing system may accumulate color contributions to pixels from objects intersected by secondary rays as the further color contributions are determined. Furthermore, by associating a scaling factor of color contribution with objects, and thus with secondary rays are spawned from the objects, color contributions due to secondary ray/object intersections may be calculated at a later time than the color contribution from original ray/object intersection. Therefore, a vector throughput engine 210 and consequently a workload manager 205 need not wait for all secondary ray/object intersections to be determined before updating the color of a pixel.

According to one embodiment of the invention, a particular workload manager 205 may be responsible for maintaining the color updates of the pixel 535 through which the original ray 540 passed. Furthermore, the color information for all pixels which may make up the final two dimensional image 510 rendered from the three dimensional scene 505 may be stored in a frame buffer. The frame buffer may be a two dimensional memory space which corresponds to the pixel layout of a monitor 510. The frame buffer may be stored in the cache of a workload manager 205, or in the shared cache 110 of the multiple core processing element 100. The workload manager 205 may update the color of the pixel in the frame buffer by writing color information to the memory location in the frame buffer corresponding to the pixel 535 through which the original ray 540 passed.

A vector throughput engine 210 may notify the workload manager 205 of a change in color to the pixel 535 through which the ray 540 passed by sending color information to the responsible workload manager 205 along with information defining the pixel 535 through which the original ray 540 passed. The workload manager 205 responsible for the pixel may be determined by the pixel 535 information which was sent to the vector throughput engine 210 along with the information which defined the ray 540. Once the workload manager 205 has received the information defining the pixel 535 and the color update from the vector throughput engine 210 associated with the pixel 535, the workload manager 205 may then update the color of the pixel. By having a single workload manager responsible for the color of a pixel, colors determined from intersections between original rays and objects or secondary rays and objects may be accumulated without the need to wait for further determinations relating to objects and secondary rays.

Exemplary Pixel Color Accumulation

Figure 7:
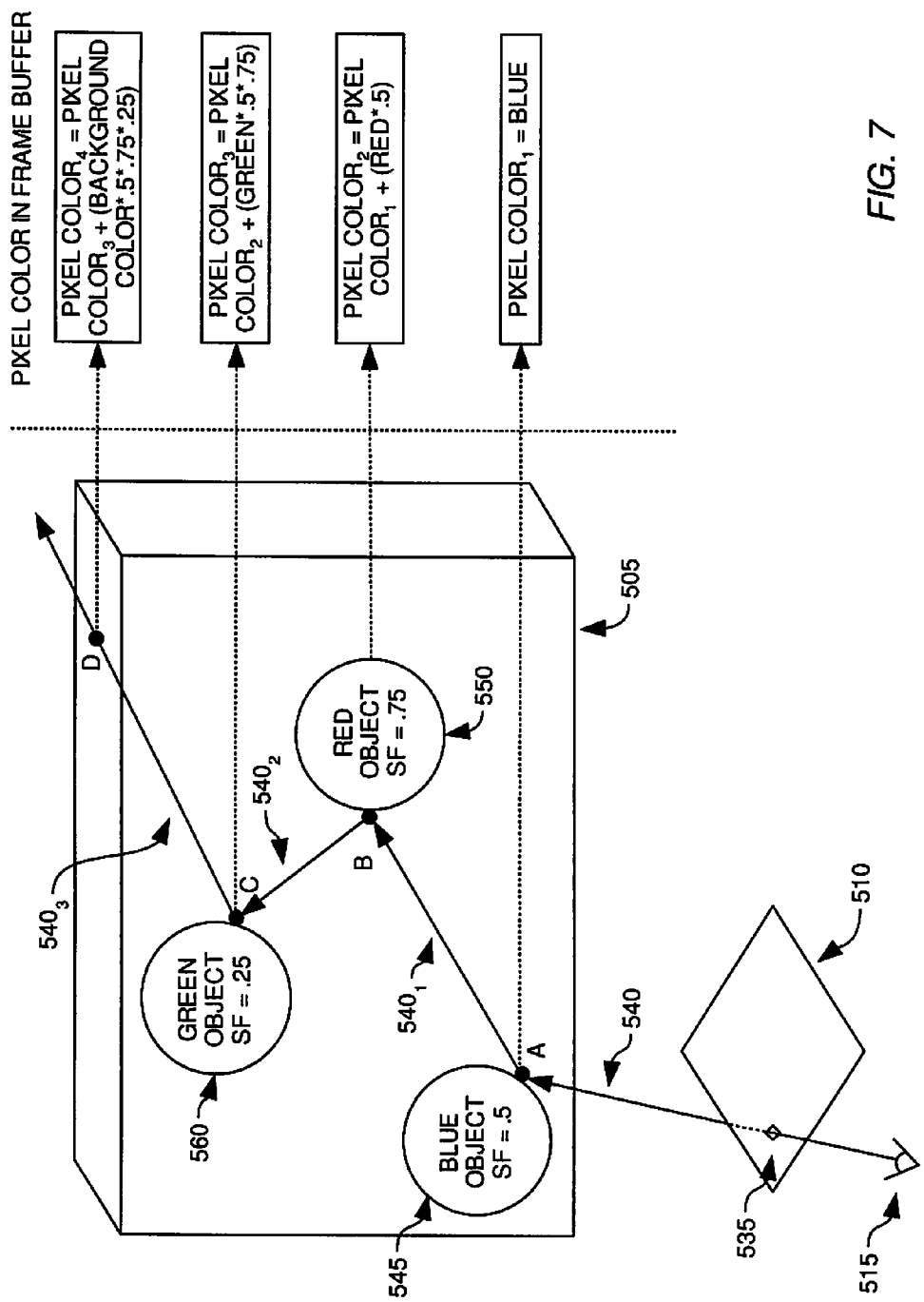

FIG. 7 illustrates an exemplary three dimensional scene 505 to be rendered by an image processing system, according to one embodiment of the invention. FIG. 7 is similar to the three dimensional scene 505 illustrated in FIG. 5. However, FIG. 7 illustrates scaling factors associated with each object in the three dimensional scene 505. Furthermore, FIG. 7 illustrates updating the color of the pixel 535 through which the original ray 545 passed as the ray traversed into the three dimensional scene 505.

As illustrated in FIG. 7, an original ray 540 may be issued into the three dimensional scene 505. The image processing system, through the use of a workload manager 205, may trace the ray 540 through a spatial index (e.g., kd-tree) to determine that the ray 540 intersects a bounding volume defined by a leaf node which encompasses either the entire the blue object 545 or a portion of the blue object 545. In response to this determination the workload manager 205 may send the information defining the ray 540 and the intersected leaf node to a vector throughput engine 210, where ray-primitive intersection tests may be performed. As a result of the ray-primitive intersection tests, the vector throughput engine 210 may determine that the original ray 540 intersects the blue object 545 at point A. Furthermore, the vector throughput engine 210 may determine that the blue object 545 is indeed blue at the intersection point of the original ray and the object (i.e., at point A). Accordingly the vector throughput engine 210 may send the pixel color information to the workload manager 205 responsible for the pixel 535. The responsible workload manager 205 may then update the memory location in the frame buffer corresponding to the pixel with the blue color.

To facilitate understanding, each of the three objects (i.e., the blue object 545, the red object 550 and the green object 560) in the three dimensional scene 505 have reflective properties but do not have refractive properties. Therefore, in response to the intersection of a ray with each object, the image processing system may issue only reflective secondary rays and not refractive secondary rays. However, it should be apparent to those skilled in the art that embodiments of the invention may be applied to refractive secondary rays as well.

Therefore, as illustrated in FIG. 7, the image processing system or the vector throughput engine 210 may issue a reflected secondary ray $540_1$ from the point of intersection of the original ray 540 and the blue object 545 (i.e., point A). The vector throughput engine 210 may also associate a scaling factor of color contribution with the information defining the reflected secondary ray $540_1$. The scaling factor of color contribution may be based on the properties of the object intersected by the prior ray (i.e., the blue object 545). Thus, the vector throughput engine 210 may associate the reflective scaling factor of color contribution for the blue object 545 (i.e., 0.50) with the reflected secondary ray $540_1$.

The image processing system may then use a workload manager 205 to traverse the secondary ray $540_1$ through a spatial index representing the three dimensional scene 505. The workload manager may traverse the secondary ray $540_1$ to a leaf node encompassing the red object 550. The workload manager may then send information defining the secondary ray $540_1$ (e.g., trajectory, scaling factor of color contribution, pixel 535 identification information) and information defining the leaf node to a vector throughput engine 210.

The vector throughput engine 210 may then perform ray-primitive intersection tests determine if the secondary ray intersected any primitives/objects within the bounding volume corresponding to the leaf node. As is illustrated in FIG. 7, the vector throughput engine may determine that the reflected secondary ray $540_1$ intersects the red object 550 at point B. After determining that the secondary ray $540_1$ intersects the red object 550, the vector throughput engine 210 may determine the color contribution that the red object 550 adds to the pixel 535 through which the original ray 540 passed.

As illustrated, the vector throughput engine 210 may calculate the color contribution the to the pixel 535 by applying the scaling factor of color contribution associated with the blue object and the secondary ray $540_1$ to the color of the red object 550, according to one embodiment of the invention. For example, the color of the red object (i.e., red) may be multiplied by the scaling factor associated with the secondary ray $540_1$ (i.e., 0.50) to determine a scaled color contribution from the red object 550 (0.5*red). After the scaled color contribution has been calculated, the vector throughput engine 210 may send the scaled color contribution to the workload manager 205 responsible for updating the memory location in the frame buffer corresponding to the pixel 535 through which the original ray 540 passed.

As illustrated in FIG. 7, the workload manager 205 may add the additional scaled color contribution (0.5*red) to the color already assigned to the pixel in the frame buffer (blue). This will properly reflect the fact that the blue object reflects a scaled portion of the color of the red object. Therefore, as in real life a person in the position of the viewer 515 will see a combination of a blue color from the blue object 545 and a red color reflected by the blue object 545.

After the vector throughput engine 210 has sent the scaled color contribution to the workload manager 205, the vector throughput engine 210 may issue a reflected secondary ray $540_2$ from the intersection point B. In the information which defines the reflected secondary ray $540_2$ may be a scaling factor. The scaling factor for the secondary ray $540_2$ may be a product of the scaling factor of contribution for the blue object and the scaling factor of the red object. That is, when a secondary ray is generated from the intersection of a secondary ray and an object, according to one embodiment of the invention, the scaling factor of color contribution for the new secondary ray may be the product of the scaling factor of color contribution associated with all the previously intersected objects.

Therefore, the scaling factor of color contribution for the secondary ray $540_2$ may be the product of the scaling factor of color contribution for the blue object 545 and the scaling factor of color contribution for the red object 550 (i.e., 0.50*0.75). By multiplying the scaling factor of color contribution each time a new object is intersected by a secondary ray, the amount of color contribution to the pixel 535 through which the original ray 540 passed from the objects intersected by secondary rays decreases as more objects are intersected.

Furthermore, the vector throughput engine 210 may determine that the reflected secondary ray 540 intersects the green object 560 at point C. The vector throughput engine 210 may then determine the color of the green object and the amount of color the green object 560 contributes to the pixel 535 through which the original ray 540 passed.

The vector throughput engine 210 may determine the scaled color for the ray $540_2$ contributed to the pixel 535 by multiplying the scaling factor of color contribution with the color of the intersected green object 560 (e.g., 0.50*0.75*Green). The vector throughput engine 210 may then send scaled the color contribution to the workload manager 205 responsible for updating the color of the pixel 535. As illustrated in FIG. 7, the workload manager 205 may update the color of the pixel by adding the scaled color contribution from the green object 560 to the color already present in the frame buffer (i.e., Blue+0.50*Red+0.50*0.75*Green).

Furthermore, as illustrated the image processing system may spawn another reflected secondary ray $540_3$ from the intersection point C. A workload manager 205 may determine that the secondary ray $540_3$ intersects a leaf node containing point D, and a vector throughput engine 210 may determine that the secondary ray $540_3$ does not intersect any primitives contained within the leaf node. The vector throughput engine 210 may determine that the secondary ray $540_3$ exits the three dimensional scene 505 without intersecting any objects, and therefore the background color should be used to determine the color contributed to the pixel 535.

Thus the vector throughput engine 210 may determine the scaled color contribution from the background color by multiplying a scaling factor determined by the previously intersected objects with the background color (e.g., 0.50*0.75*0.25*Background Color). The vector throughput engine 210 may then send the scaled color contribution to the workload manager 205 responsible for updating the color of the pixel 535 in the frame buffer. Consequently, the workload manager 205 may then update the color of the pixel 535 in the frame buffer by adding the color contribution from the background to the color of the pixel in the frame buffer (i.e., Blue+0.50*Red+0.50*0.75*Green+0.50*0.75*0.25* Background Color).

CONCLUSION

By merging or adding the color contributions from objects intersected by secondary rays, the image processing system may accumulate color contributions to pixels from objects intersected by secondary rays as the further color contributions are determined. Furthermore, by associating a scaling factor of color contribution with objects and with secondary rays which intersect the objects, color contributions due to secondary ray/object intersections may be calculated at a later time than the color contribution to a pixel from original ray/object intersection. Consequently, it is not necessary for a vector throughput engine or a workload manager to wait for all secondary ray/object intersections to be determined before updating the color of a pixel.

While the foregoing is directed to embodiments of the present invention, other and further embodiments of the invention may be devised without departing from the basic scope thereof, and the scope thereof is determined by the claims that follow.

What is claimed is:

1. A method of determining a color of a pixel in a ray tracing image processing system, comprising:
    issuing a primary ray into a three dimensional scene through the pixel;
    determining an initial color value for the pixel based on a color value of a first primitive intersected by the primary ray;
    issuing a secondary ray into the scene from the primitive intersected by the primary ray;
    by operation of one or more computer processors, updating the color value for the pixel based on a color value of a second primitive intersected by the secondary ray and a reflective or refractive scaling factor having a predetermined association with the first primitive intersected by the primary ray, and not based on a reflective or refractive scaling factor of the second primitive;
    issuing a further secondary ray into the scene from the primitive intersected by the secondary ray; and
    updating the color value for the pixel based on a color value of a third primitive intersected by the further secondary ray and a second reflective or refractive scaling factor based on the first primitive and the second primitive, and not based on a reflective or refractive scaling factor of the third primitive.

2. The method of claim 1, wherein the second reflective or refractive scaling factor is calculated based on a combination of the reflective or refractive scaling factor associated with the first primitive and the reflective or refractive scaling factor associated with the second primitive.

3. The method of claim 2, wherein the combination is determined by multiplying the reflective or refractive scaling factor associated with the first primitive by the reflective or refractive scaling factor associated with the second primitive.

4. An image processing system comprising:
    a memory cache;
    a first processing element configured to issue an original ray into a three dimensional scene through a pixel, traverse a spatial index with the original ray until a first leaf node is reached; and
    a second processing element configured to receive, from the first processing element, information defining the original ray and the first leaf node, determine a first color contribution to the pixel based on a color of a first primitive intersected by the original ray, determine a first reflective or refractive scaling factor of color contribution based on the first primitive, issue a secondary ray based on the intersection of the original ray and the first primitive, and associate the first reflective or refractive scaling factor of color contribution with the secondary ray;

wherein the first processing element is further configured to traverse the spatial index with the secondary ray until a second leaf node is reached;

wherein the second processing element is further configured to:

receive, from the first processing element, information defining the secondary ray and the second leaf node;

determine a second color contribution to the pixel based on a color of a second primitive intersected by the secondary ray and the first reflective or refractive scaling factor, and not based on a second reflective or refractive scaling factor of the second primitive;

determine a third reflective or refractive scaling factor of color contribution based on the first reflective or refractive scaling factor and the second reflective or refractive scaling factor, and not based on a reflective or refractive scaling factor of the third primitive:

issue a further secondary ray based on the intersection of the secondary ray and the second primitive; and associate the third reflective or refractive scaling factor of color contribution with the further secondary ray.

5. The system of claim 4, further comprising:

a memory location in the memory cache corresponding to the pixel; and wherein the second processing element is configured to store the first color contribution to the pixel in the memory location corresponding to the first pixel.

6. The system of claim 4, wherein the first processing element is further configured to read the color of the pixel from the memory location in the memory cache corresponding to the pixel, combine the color of the pixel read from the memory location with the second color contribution to the pixel, and store the combination in the memory location in the memory cache corresponding to the pixel.

7. The system of claim 4, wherein the third reflective or refractive scaling factor of color contribution is determined based on a combination of properties of the first primitive and properties of the second primitive.

8. The system of claim 7, wherein the third scaling factor of color contribution is determined by multiplying a reflective or refractive scaling factor associated with the first primitive by a reflective or refractive scaling factor associated with the second primitive.

9. A non-transitory computer-readable medium containing a program which, when executed, performs operations comprising:

issuing a primary ray into a three dimensional scene through a pixel;

determining an initial color value for the pixel based on a color value of a first primitive intersected by the primary ray;

issuing a secondary ray into the scene from the primitive intersected by the primary ray;

updating the color value for the pixel based on a color value of a second primitive intersected by the secondary ray and a reflective or refractive scaling factor having a predetermined association with the first primitive intersected by the primary ray, and not based on a reflective or refractive scaling factor of the second primitive;

issuing a further secondary ray into the scene from the primitive intersected by the secondary ray; and updating the color value for the pixel based on a color value of a third primitive intersected by the further secondary ray and a second reflective or refractive scaling factor based on the first primitive and the second primitive, and not based on a reflective or refractive scaling factor of the third primitive.

10. The non-transitory computer-readable medium of claim 9, wherein the second reflective or refractive scaling factor is calculated based on a combination of the reflective or refractive scaling factor associated with the first primitive and the reflective or refractive scaling factor associated with the second primitive.

11. The non-transitory computer-readable medium of claim 10, wherein the combination is determined by multiplying the reflective or refractive scaling factor associated with the first primitive by the reflective or refractive scaling factor associated with the second primitive.

* * * * *